(12) United States Patent
Chen

(10) Patent No.: US 8,451,047 B2
(45) Date of Patent: May 28, 2013

(54) CIRCUIT USED FOR INDICATING PROCESS CORNER AND EXTREME TEMPERATURE

(75) Inventor: Yi-Lung Chen, Keelung (TW)

(73) Assignee: ISSC Technologies Corp., Hsinchu (TW)

( * ) Notice: Subject to any disclaimer, the term of this patent is extended or adjusted under 35 U.S.C. 154(b) by 26 days.

(21) Appl. No.: 13/109,858

(22) Filed: May 17, 2011

(65) Prior Publication Data

US 2012/0293238 A1 Nov. 22, 2012

(51) Int. Cl.
*G01K 7/01* (2006.01)

(52) U.S. Cl.
USPC .......................................... 327/512; 327/581

(58) Field of Classification Search
None
See application file for complete search history.

(56) References Cited

U.S. PATENT DOCUMENTS

| | | | |
|---|---|---|---|
| 5,903,012 A | 5/1999 | Boerstler | |
| 6,668,346 B1 | 12/2003 | Schulz et al. | |
| 6,946,896 B2 * | 9/2005 | Behzad | 327/512 |
| 7,449,908 B2 | 11/2008 | Burns et al. | |
| 7,532,056 B2 * | 5/2009 | Seo | 327/512 |
| 7,775,710 B2 * | 8/2010 | Mukherjee | 374/170 |
| 7,780,346 B2 * | 8/2010 | Chellappa | 374/178 |

* cited by examiner

*Primary Examiner* — Lincoln Donovan
*Assistant Examiner* — Terry L Englund
(74) *Attorney, Agent, or Firm* — Ming Chow; Sinorica, LLC

(57) ABSTRACT

A circuit used for indicating process corner and extreme temperature mainly comprises a proportional to absolute temperature (PTAT) current source, a negative to absolute temperature (NTAT) current source, a constant to absolute temperature (CTAT) current source, a corner detector, a poly detector, an extreme temperature detector. The circuit can improve more power consumption without trade-off. In debug phase, the circuit can read out a state of a suspect sample and can run simulation check quickly to identify the real problem. In production phase, the circuit can easily read out at a processing station. In the mean time, a large quantity of data can be easily collected and analyzed.

7 Claims, 16 Drawing Sheets

| State \ Parameters | Vthn | Vthp | $I_{DET1}$ |
|---|---|---|---|
| (T, T) | — | — | — |
| (F, F) | ↓ | ↓ | ↑ |
| (S, S) | ↑ | ↑ | ↓ |
| (S, F) | ↑ | ↓ | — |
| (F, S) | ↓ | ↑ | — |

<P.S. T:Typical, F:Fast, S:Slow of (nMOS, pMOS)>

FIG. 11

| Parameters / State | Vthn | Vthp | $I_{DET2}$ |
|---|---|---|---|
| (T, T) | — | — | — |
| (F, F) | ↓ | ↓ | — |
| (S, S) | ↑ | ↑ | — |
| (S, F) | ↑ | ↓ | ↓ |
| (F, S) | ↓ | ↑ | ↑ |

<P.S. T:Typical, F:Fast, S:Slow of (nMOS, pMOS)>

FIG. 12

| Parameters / State | POLY-D | $I_{OUT\_POLY}$ |
|---|---|---|
| POT | — | — |
| POF | ↓ | ↑ |
| POS | ↑ | ↓ |

<P.S. T:Typical, F:Fast, S:Slow>

FIG. 13

| State \ Parameters | -40 ℃ | 85℃ | others |
|---|---|---|---|
| (TH) | 0 | 1 | 0 |
| (TM) | 0 | 0 | 1 |
| (TL) | 1 | 0 | 0 |

<P.S. TH:Temperature High, TM:Temperature, Middle, TL:Temperature Low)>

FIG. 14

| Output Name / States | TT | FF | SS | FS | SF | POS | POT | POF | TH | TM | TL |
|---|---|---|---|---|---|---|---|---|---|---|---|
| FF,27 | 0 | 1 | 0 | 0 | 0 | 0 | 0 | 1 | 0 | 1 | 0 |
| FF,85 | 0 | 1 | 0 | 0 | 0 | 0 | 0 | 1 | 1 | 0 | 0 |
| FF,-40 | 0 | 1 | 0 | 0 | 0 | 0 | 0 | 1 | 0 | 0 | 1 |
| FS,27 | 0 | 0 | 0 | 1 | 0 | 0 | 1 | 0 | 0 | 1 | 0 |
| FS,85 | 0 | 0 | 0 | 1 | 0 | 0 | 1 | 0 | 1 | 0 | 0 |
| FS,-40 | 0 | 0 | 0 | 1 | 0 | 0 | 1 | 0 | 0 | 0 | 1 |
| SF,27 | 0 | 0 | 0 | 0 | 1 | 0 | 1 | 0 | 0 | 1 | 0 |
| SF,85 | 0 | 0 | 0 | 0 | 1 | 0 | 1 | 0 | 1 | 0 | 0 |
| SF,-40 | 0 | 0 | 0 | 0 | 1 | 0 | 1 | 0 | 0 | 0 | 1 |
| SS,27 | 0 | 0 | 1 | 0 | 0 | 1 | 0 | 0 | 0 | 1 | 0 |
| SS,85 | 0 | 0 | 1 | 0 | 0 | 1 | 0 | 0 | 1 | 0 | 0 |
| SS,-40 | 0 | 0 | 1 | 0 | 0 | 1 | 0 | 0 | 0 | 0 | 1 |
| TT,27 | 1 | 0 | 0 | 0 | 0 | 0 | 1 | 0 | 0 | 1 | 0 |
| TT,85 | 1 | 0 | 0 | 0 | 0 | 0 | 1 | 0 | 1 | 0 | 0 |
| TT,-40 | 1 | 0 | 0 | 0 | 0 | 0 | 1 | 0 | 0 | 0 | 1 |

FIG. 15

CIRCUIT USED FOR INDICATING PROCESS CORNER AND EXTREME TEMPERATURE

BACKGROUND OF THE INVENTION

1. Field of the Invention

The present invention relates generally to detecting circuit, and more particularly, to a circuit used for indicating process corner and extreme temperature.

2. Background

The circuits constructed on an IC chip or substrate is referred to as integrated circuits. Integrated circuits include transistors and resistors, for example. Integrated circuits are fabricated or manufactured in high volume using integrated circuit processes, such as a CMOS process. The integrated circuits may be characterized in terms of various circuit parameters, such as sheet-rho, transistor threshold voltage, and a transistor transconductance parameter, to name but a few.

The primary challenge in designing integrated circuits (IC) is to control circuit parameters, such as delay, in view of variations in the semiconductor fabrication process, supply voltage, and temperature. All of the above parameters and variables generally exhibit complex relationships among each other. Attaining homogeneous transistor operating parameters, such as threshold voltage and transconductance, within an integrated circuit is one of the most important, yet most difficult objectives for precision analog circuits. Transistor threshold voltage is also very critical in propagation speed for high speed low voltage digital circuits.

Process variations can cause unpredictable and undesired variations of the circuit parameters, which can adversely affect circuit performance. In other words, the circuit parameters tend to be process dependent. Thus, it is useful for a manufacturer to be able to quantify or determine the circuit parameters. Accordingly, there is a need to be able to measure and determine process-dependent circuit parameters associated with circuits constructed on an IC chip. A related need is to be able to determine a temperature of the IC chip and/or a power supply voltage of the IC chip.

U.S. Pat. No. 5,903,012, issued to David William Boerstler entitled "Process variation monitor for integrated circuits" discloses a current proportional to threshold voltage of MOS device. The circuit is shown in FIG. 1. Processing variation will cause the threshold voltage to be changed. However the threshold voltage also changed when temperature varies, including temperature effect we will be confused which one is the dominated factor.

U.S. Pat. No. 6,668,346, issued to Jurgen M. Schulz et al. entitled "Digital process monitor" discloses a ring oscillator is used for process detector. The circuit is shown in FIG. 2 However, temperature dependent oscillation frequency will also influence the counted result. User will be confused by process variation and temperature disturbance.

U.S. Pat. No. 7,449,908, issued to Lawrence M Burns et al. entitled "Process monitor for monitoring an integrated circuit chip" discloses by using varies of detector, the voltage signal then pass through a ADC for generating a digital codes is produced. The circuit is shown in FIG. 3. However, there are too much complex structure are used, which spends more layout area and calibration time. In additional, it needs an external off-chip accurate resistor to generate a constant current source, furthermore increases the BOM (Bill-of-material) of the product.

BRIEF SUMMARY OF THE INVENTION

It is an objective of the present invention to provide a circuit used for indicating process corner and extreme temperature.

By using the corner detector, the poly detector and extreme temperature detector, the worst corner of the process can easily be identified. It can save more power consumption without trade-off as compared to the conventional method of increasing the operated current.

To achieve the above objective, the present invention provides a circuit used for indicating process corner and extreme temperature, comprising: a proportional to absolute temperature (PTAT) current source, a negative to absolute temperature (NTAT) current source, a constant to absolute temperature (CTAT) current source, a corner detector, a poly detector, and an extreme temperature detector. The proportional to absolute temperature (PTAT) current source has an output terminal and is used for providing a current ($I_{PTAT}$). The negative to absolute temperature (NTAT) current source has an output terminal and is used for providing a current ($I_{NTAT}$). The constant to absolute temperature (CTAT) current source has an output terminal and is used for providing a current ($I_{CTAT}$). The corner detector has an input terminal and an output terminal, where the input terminal is electrically connected to the output terminal of the constant to absolute temperature (CTAT) current source, and the corner detector is used for indicating the detected corner state. The poly detector has a first input terminal, a second input terminal, a third input terminal and an output terminal, where the first input terminal is electrically connected to the output terminal of the proportional to absolute temperature (PTAT) current source, the second input terminal is electrically connected to the output terminal of the negative to absolute temperature (NTAT) current source, the third input terminal is electrically connected to the output terminal of the constant to absolute temperature (CTAT) current source, and the poly detector is used for indicating the detected poly state. The extreme temperature detector has a first input terminal, a second input terminal, and an output terminal, where the first input terminal is electrically connected to the output terminal of the proportional to absolute temperature (PTAT) current source, the second input terminal is electrically connected to the output terminal of the poly detector, and the extreme temperature detector is used for indicating the detected temperature state.

According to one aspect of the present invention, the circuit used for indicating process corner and extreme temperature can be realized by using the 0.18 μm, 0.13 μm, 0.09 μm, 0.045 μm, 0.023 μm, 0.011 μm or the advanced process.

According to one aspect of the present invention, the corner detector further comprising: a first n-type MOS, a second n-type MOS, a third n-type MOS, a fourth n-type MOS, a fifth n-type MOS, a sixth n-type MOS, a first p-type MOS, a second p-type MOS, a first comparator, a second comparator, and a regulator. The first n-type MOS has a gate terminal, a source terminal and a drain terminal, where the source terminal is electrically connected to ground. The second n-type MOS has a gate terminal, a source terminal and a drain terminal, where the source terminal is electrically connected to ground. The third n-type MOS has a gate terminal, a source terminal and a drain terminal, where the source terminal is electrically connected to ground. The fourth n-type MOS has a gate terminal, a source terminal and a drain terminal, where the source terminal is electrically connected to ground. The fifth n-type MOS has a gate terminal, a source terminal and a drain terminal, where the source terminal is electrically connected to ground. The sixth n-type MOS has a gate terminal, a source terminal and a drain terminal, where the source terminal is electrically connected to ground. The first p-type MOS has a gate terminal, a source terminal and a drain terminal, where the gate terminal is electrically connected to the drain terminal of the third n-type MOS, and the drain terminal is electrically connected to the gate terminal of the third n-type MOS. The second p-type MOS has a gate terminal, a source terminal and a drain terminal, where the drain terminal and the gate terminal are electrically connected to ground. The first comparator has a first input terminal, a second input terminal, a third input terminal, a first output terminal and a ground terminal, where the first input terminal is electrically connected to the drain terminal of the first n-type MOS, and the second input terminal is electrically connected to the drain terminal of the second n-type MOS, the third input terminal is electrically connected to the output terminal of the constant to absolute temperature (CTAT) current source. The first comparator is used for determining the detected corner state according to the relationship of a first detected current ($I_{DET1}$), a threshold voltage of the first p-type MOS, and a threshold voltage of the third n-type MOS. The second comparator has a first input terminal, a second input terminal, a third input terminal, a first output terminal and a ground terminal, where the first input terminal is electrically connected to the drain terminal of the fourth n-type MOS, the second input terminal is electrically connected to the drain terminal of the fifth n-type MOS, and the third input terminal is electrically connected to the output terminal of the constant to absolute temperature (CTAT) current source. The second comparator is used for determining the detected corner state according to the relationship of a second detected current ($I_{DET2}$), a threshold voltage of the second p-type MOS, and a threshold voltage of the sixth n-type MOS. The regulator has an output terminal and a ground terminal, where the output terminal is electrically connected to the source terminal of the first p-type MOS. The regulator is used for providing a predetermined voltage ($V_{DET}$). Wherein the gate terminal of the first n-type MOS, the gate terminal of the second n-type MOS, the gate terminal of the third n-type MOS are connected to the drain terminal of the first p-type MOS. The gate terminal of the fourth n-type MOS, the gate terminal of the fifth n-type MOS, the gate terminal of the sixth n-type MOS are connected to the drain terminal of the second p-type MOS. The drain terminal of the sixth n-type MOS is used for receiving the second detected current ($I_{DET2}$). The source terminal of the second p-type MOS is used for receiving the current ($I_{CTAT}$) of the constant to absolute temperature (CTAT) current source.

According to one aspect of the present invention, the first n-type MOS, the second n-type MOS, the third n-type MOS, the fourth n-type MOS, the fifth n-type MOS, the sixth n-type MOS, the first p-type MOS and the second p-type MOS can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

According to one aspect of the present invention, the poly detector further comprising: a first poly resistor, an operational amplifier, a first p-type MOS, a second p-type MOS, and a second poly resistor. The first poly resistor has a first terminal and a ground terminal and is used for providing a temperature compensated reference voltage ($V_{NBG}$). The operational amplifier has an output terminal, a negative input terminal and a positive input terminal, where the negative input terminal is electrically connected to the first terminal of the first poly resistor. The first p-type MOS has a gate terminal, a source terminal and a drain terminal, the drain terminal is electrically connected to the positive terminal of the operational amplifier. The second p-type MOS has a gate terminal, a source terminal and a drain terminal. The second poly resistor has a first terminal and a ground terminal, where the first terminal is electrically connected to the drain terminal of the first p-type MOS. Wherein the temperature compensated reference voltage ($V_{NBG}$) is generating by passing a current ($I_{POLY}$) to the first poly resistor, where the current ($I_{POLY}$) is the summation of the current of the proportional to absolute temperature (PTAT) current source and the current of negative to absolute temperature (NTAT) current source. The gate terminal of the first p-type MOS and the gate terminal of the second p-type MOS are electrically connected to the output terminal of the operational amplifier, the drain terminal of the second p-type MOS is used for outputting an output current ($I_{OUT\_POLY}$) of the poly detector.

According to one aspect of the present invention, the first p-type MOS and the second p-type MOS can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

According to one aspect of the present invention, the extreme temperature detector further comprising: a substractor, and an amplifier. The substractor has a first input terminal, a second input terminal and an output terminal, where the first input terminal is electrically connected to the first input terminal of the extreme temperature detector, and the second input terminal is electrically connected to the second input terminal of the extreme temperature detector. The amplifier has an input terminal and a output terminal, where the input terminal is electrically connected to the output terminal of the substractor. Wherein the extreme temperature detector determines the temperature state according to a outputted current of $I_{OUT\_TEMP}$ by the output terminal of the amplifier.

These and many other advantages and features of the present invention will be readily apparent to those skilled in the art from the following drawings and detailed descriptions.

BRIEF DESCRIPTION OF THE DRAWINGS

All the objects, advantages, and novel features of the invention will become more apparent from the following detailed descriptions when taken in conjunction with the accompanying drawings.

FIG. 11 shows the comparison of detected current $I_{DET1}$;

FIG. 12 shows the comparison of detected current $I_{DET2}$;

FIG. 13 shows the comparison of current $I_{OUT\_POLY}$;

FIG. 14 shows the comparison of the current ($I_{PTAT}$) and current $I_{OUT\_POLY}$; and FIG. 15 shows the outputs of the circuit used for indicating process corner and extreme temperature, each output has only two states 1 or 0.

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Figure 1:
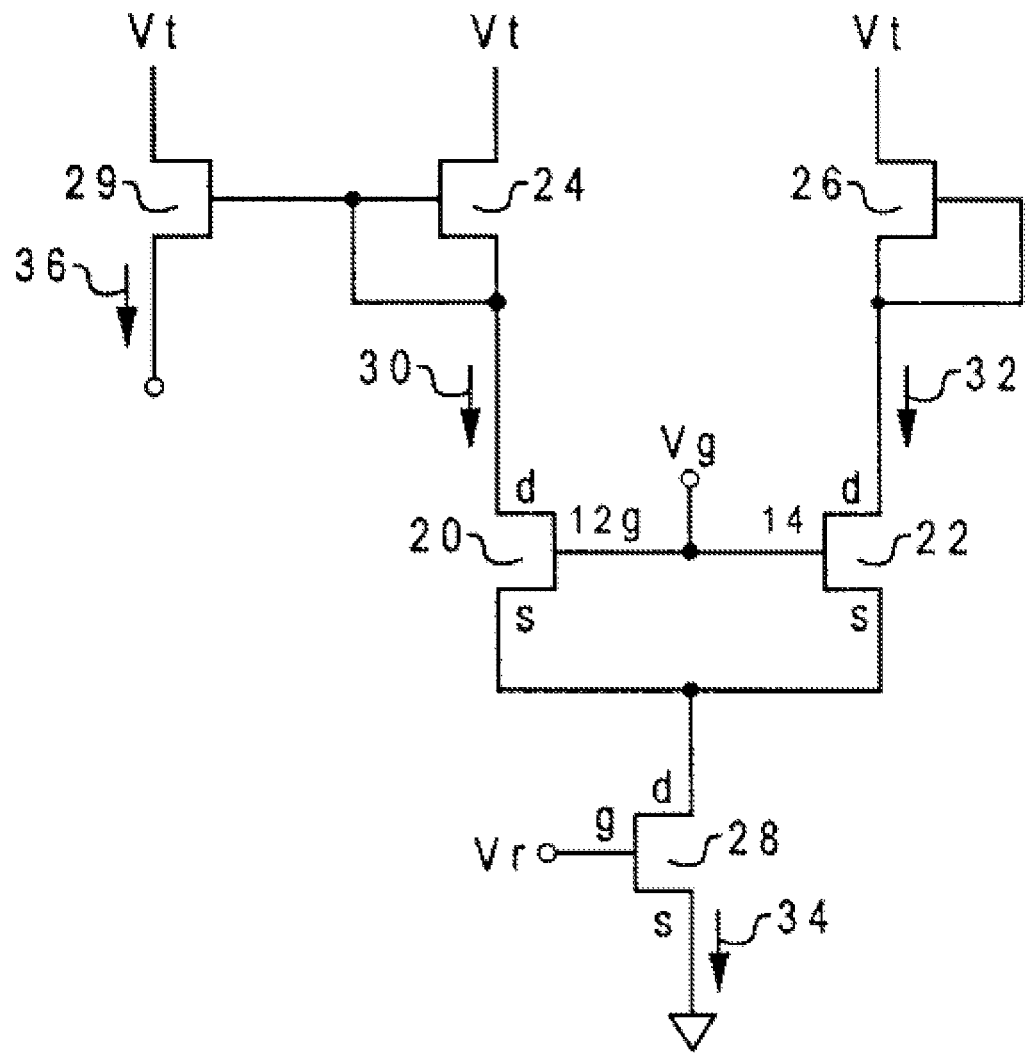
FIG. 1 shows a schematic circuit of the process variation monitor for integrated circuits of the prior art.
Figure 2:
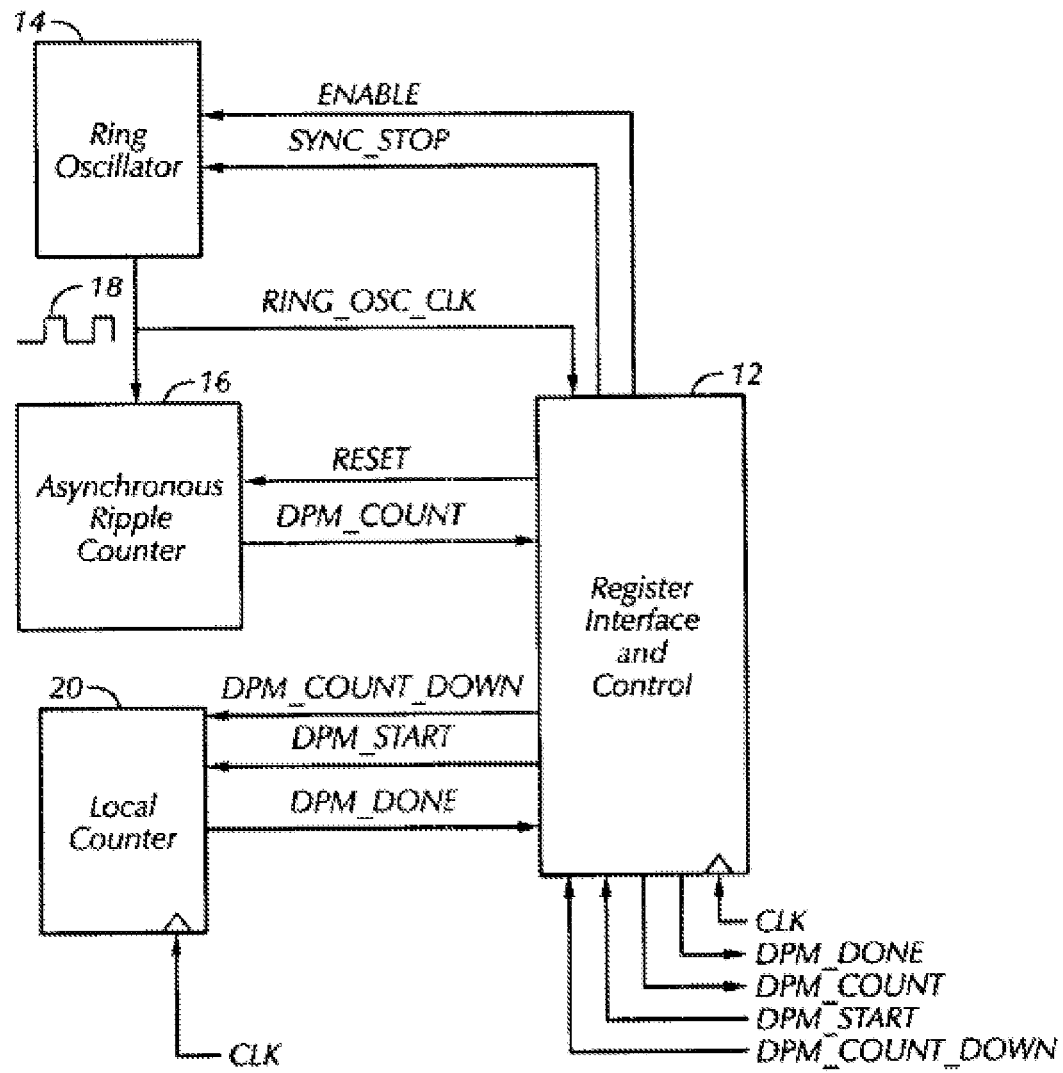
FIG. 2 shows a schematic circuit of the digital process monitor circuits of the prior art.
Figure 3:
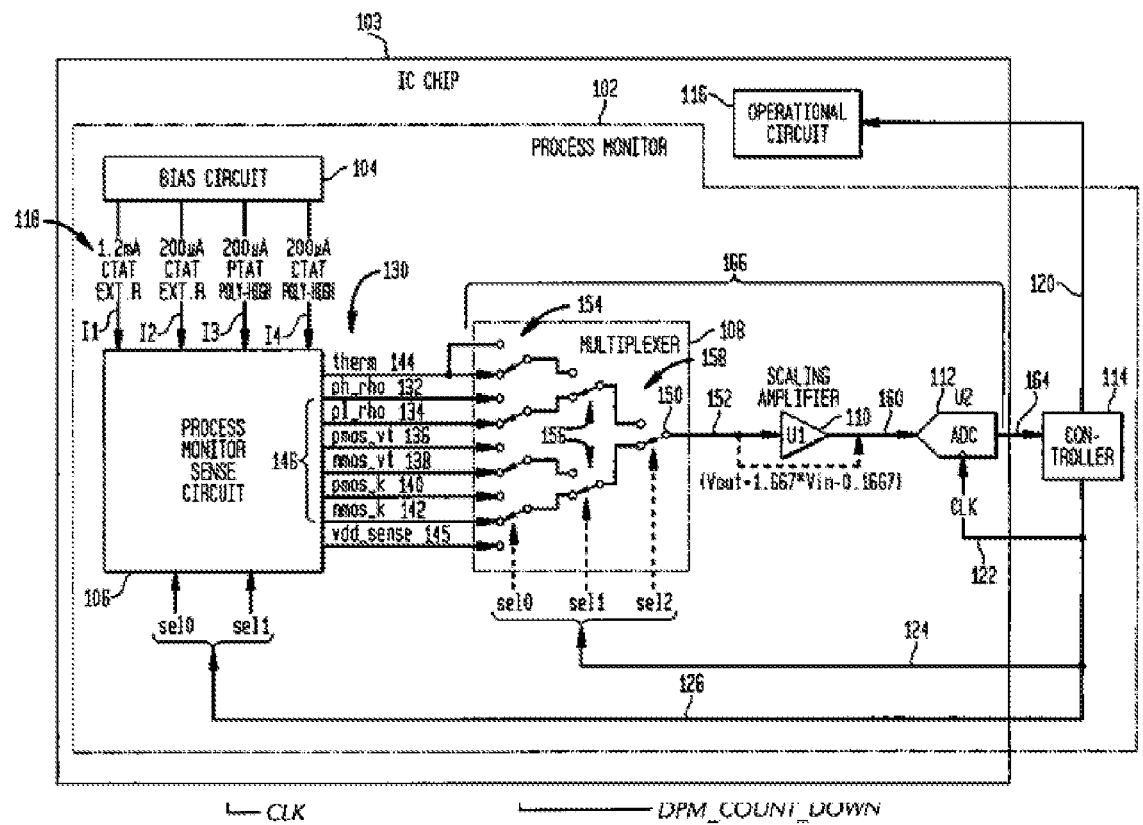
FIG. 3 shows a schematic circuit of the digital process monitor circuits of the prior art.
Figure 4:
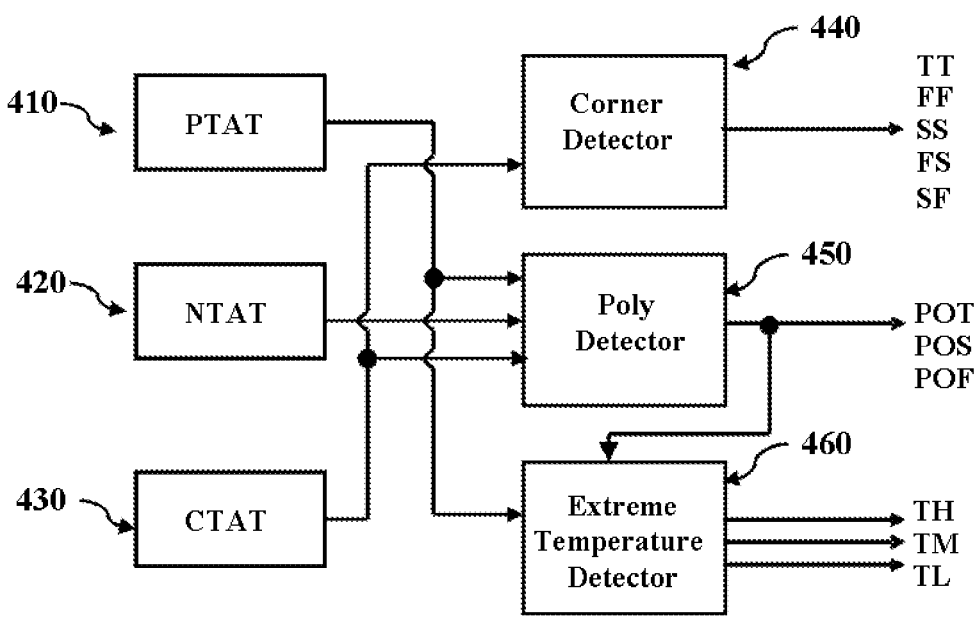
FIG. 4 shows a schematic functional block diagram of the circuit used for indicating process corner and extreme temperature 400 of the present invention.

To understand the spirit of the present invention, please referring to FIG. 4, it shows a schematic functional block diagram of the circuit used for indicating process corner and extreme temperature 400 of the present invention, wherein the circuits 400 comprises: a proportional to absolute temperature (PTAT) current source 410, a negative to absolute temperature (NTAT) current source 420, a constant to absolute temperature (CTAT) current source 430, a corner detector 440, a poly detector 450, an extreme temperature detector 460.

The proportional to absolute temperature (PTAT) current source 410 has an output terminal and is used for providing a current ($I_{PTAT}$). The negative to absolute temperature (NTAT) current source 420 has an output terminal and is used for providing a current ($I_{NTAT}$). The constant to absolute temperature (CTAT) current source 430 has an output terminal and is used for providing a current ($I_{CTAT}$). The corner detector 440 has an input terminal and an output terminal, where the input terminal is electrically connected to the output terminal of the constant to absolute temperature (CTAT) current source 430, and the corner detector 440 is used for indicating the detected corner state.

The poly detector 450 has a first input terminal, a second input terminal, a third input terminal and an output terminal, where the first input terminal is electrically connected to the output terminal of the proportional to absolute temperature (PTAT) current source 410, the second input terminal is electrically connected to the output terminal of the negative to absolute temperature (NTAT) current source 420, the third input terminal is electrically connected to the output terminal of the constant to absolute temperature (CTAT) current source 430, and the poly detector 450 is used for indicating the detected poly state. The extreme temperature detector 460 has a first input terminal, a second input terminal, and an output terminal, where the first input terminal is electrically connected to the output terminal of the proportional to absolute temperature (PTAT) current source 410, the second input terminal is electrically connected to the output terminal of the poly detector 450, and the extreme temperature detector 460 is used for indicating the detected temperature state.

By using three types of temperature coefficient current source as based component which includes the proportional to absolute temperature (PTAT) current source 410, the negative to absolute temperature (NTAT) current source 420, CTAT 430 current source, and applying these three current sources as reference to construct several detection modules which includes the corner detector 440, the poly detector 450 and the extreme temperature detector 460, the variance of doping concentration in process, the variance of poly layer in process and the variance of environment temperature can be well determined.

The variance of doping concentration in process is usually expressed as the state of (T,T), (F,F), (S,S), (S,F), (F,S), where the state of T means typical, the state of F means fast, the state of S means slow and the first place and second place in the bracket is corresponding to n-type MOS and p-type MOS, respectively. The typical state indicates that the doping concentration is equal to default value, the fast state indicates that the doping concentration is higher than default value, and slow state indicates that the doping concentration is lower than default value. The variance of poly layer in process is usually expressed as the state of POT, POF and POS, where POT means poly-in-typical, POF means poly-in-fast and POS means poly-in-slow. The state of poly-in-typical indicates that the thickness of the poly layer is equal to default value, the state of poly-in-fast indicates that the thickness of the poly layer is thicker than default value, and state of poly-in-slow indicates that the thickness of the poly layer is thinner than default value. The variance of environment temperature is usually expressed as the state of TM, TH and TL, where TM means environment temperature in middle temperature, TH means environment temperature in high temperature and TL means environment temperature in low temperature. The middle temperature is equal to 27° C., the high temperature is equal to 85° C. and the low temperature is equal to −40° C. The circuit used for indicating process corner and extreme temperature 400 can be realized by using the 0.18 μm, 0.13 μm, 0.09 μm, 0.045 μm, 0.023 μm, 0.011 μm or the advanced process.

Figure 5:
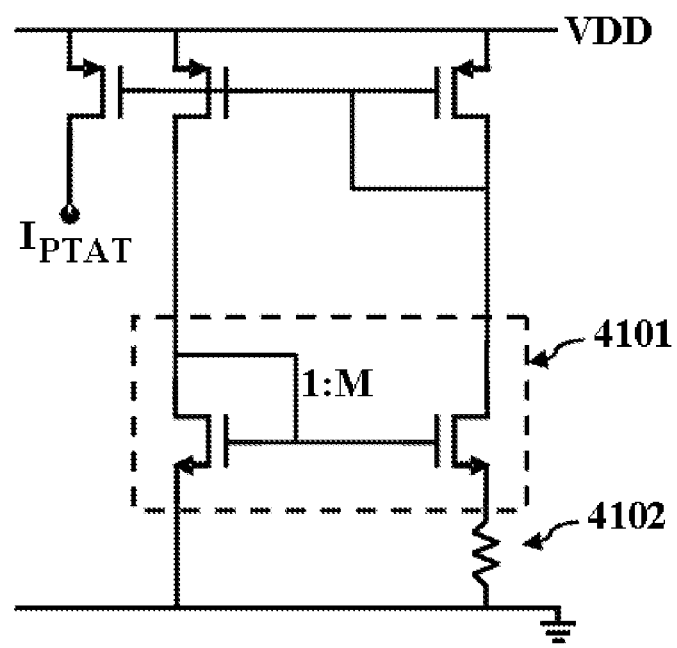
FIG. 5 shows a schematic circuit of the proportional to absolute temperature (PTAT) current source of the present invention.

Now please refer to FIG. 5, it shows the schematic circuit of the proportional to absolute temperature (PTAT) current source 410 of the present invention. By choosing the ratio (M) of the current mirror 4101 and the appropriate resistor 4102, the output current ($I_{PTAT}$) of the Proportional to absolute temperature (PTAT) current source 410, which is independent to process and voltage variation can be derived and expressed as:

$$I_{PTAT} = \frac{2}{\mu \cdot C_{ox}\left(\frac{W}{L}\right)} \frac{1}{R^2}\left(1 - \frac{1}{\sqrt{M}}\right)^2, I_{PTAT} \propto T$$

where μ is carrier mobility, $C_{ox}$ is the gate oxide capacitance per unit area, W is the gate width, L is the gate length, R is the resistance of the resistor 4102 and M is the multiply ratio of the current mirror 4101.

Figure 6:
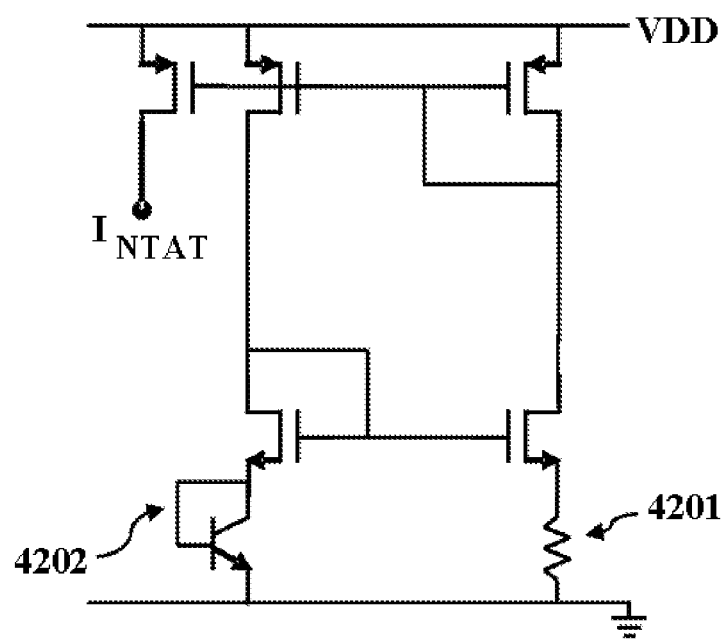
FIG. 6 shows a schematic circuit of the negative to absolute temperature (NTAT) current source of the present invention.

Now please refer to FIG. 6, it shows the schematic circuit of the negative to absolute temperature (NTAT) current source 420 of the present invention. It uses a simple circuit of current mirror to force the head voltage of BJT 4202 and the crossing voltage of resistor 4201 to be equal. Due to the intrinsic negative temperature characteristic of $V_{BE}$ of BJT 4202, the output current ($I_{NTAT}$) can be derived to be $V_{BE}/R$ and expressed as:

$$\frac{\partial V_{BE}}{\partial T} = \frac{V_{BE} - (4+m)V_T - E_g/q}{T}, I_{NTAT} = \frac{V_{BE}}{R}, I_{NTAT} \propto \frac{1}{T}$$

Figure 7:
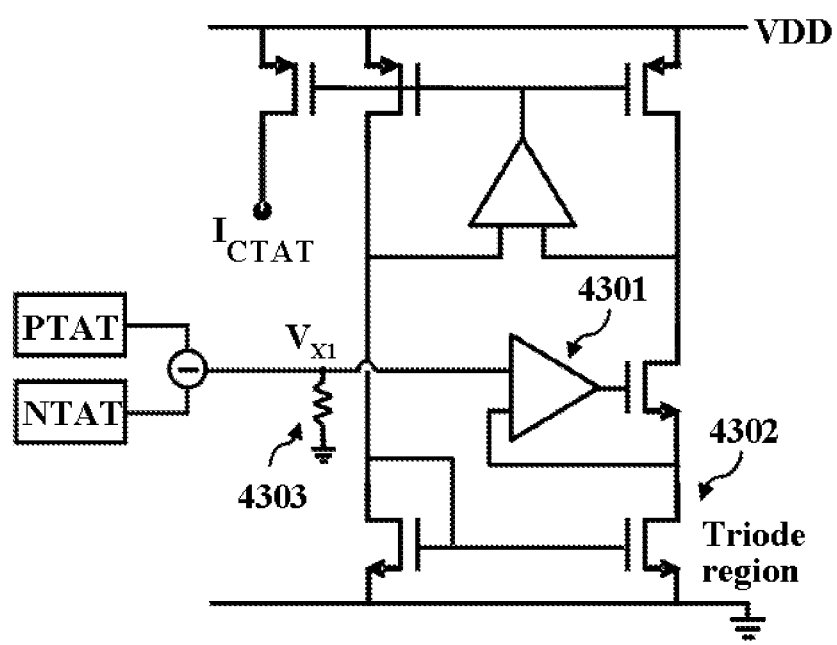
FIG. 7 shows a schematic circuit of the constant to absolute temperature (CTAT) current source of the present invention.

Now please refer to FIG. 7, it shows the schematic Constant to absolute temperature (CTAT) 430 of the present invention. It uses voltage $V_{x1}$ as reference voltage and makes the operational amplifier 4301 form a loop that forces the drain to source voltage ($Y_{ds}$) of MOS 4302 to the same voltage level as $V_{x1}$. By selecting a very low voltage level, the MOS 4302 is operating in triode region acting as a resistor. Therefore the out current ($I_{CTAT}$) could be derived from $V_{x1}$ and MOS. Wherein the voltage $V_{x1}$ could be generated from subtracting the current of negative to absolute temperature (NTAT) current source 420 from proportional to absolute temperature (PTAT) current source 410, which results a sharp slope of current ($I_{PTAT}$). Finally, to multiply the current ($I_{PTAT}$) to a first poly resistor 4303 and then obtain $V_{x1}$, using the same type resistor 4303, can eliminate the variance of poly layer in process.

Figure 8:
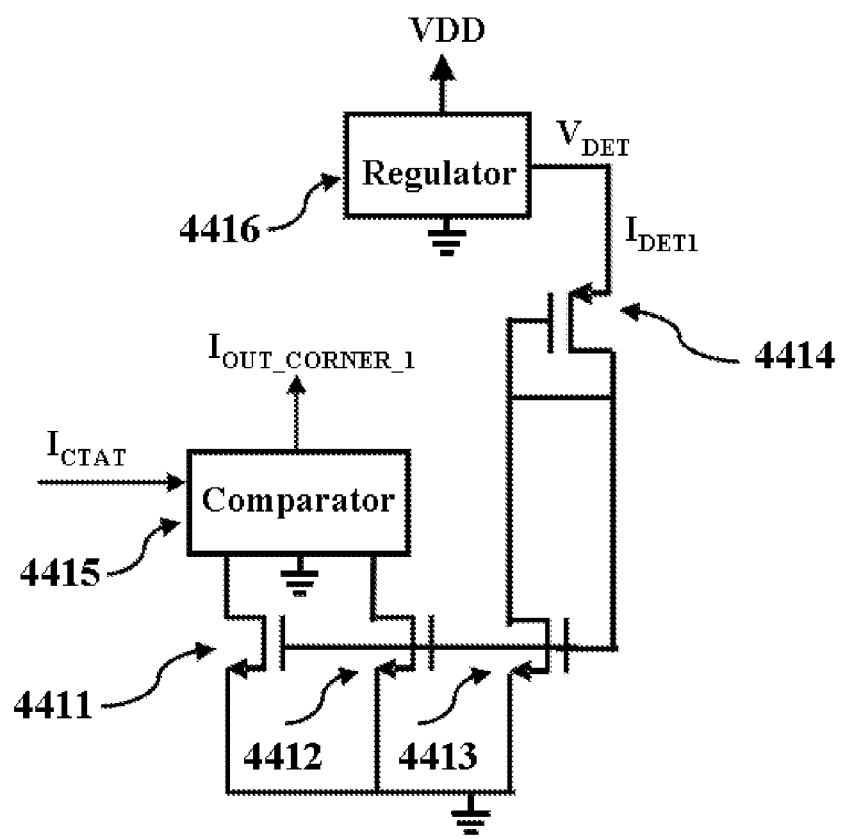
FIG. 8(a) shows a part of schematic circuit of the corner detector of the present invention.
FIG. 8(b) shows a part of schematic circuit of the corner detector of the present invention.
Figure 8:
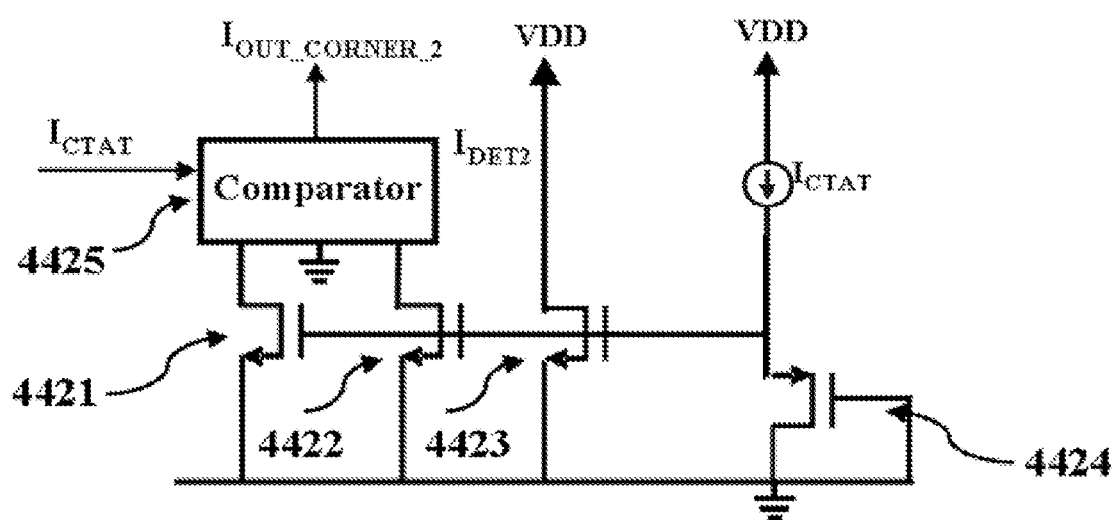

Now please refer to FIG. 8, it shows the schematic circuit of the corner detector 440 of the present invention. The corner detector 440 further comprising: a first n-type MOS 4411, a second n-type MOS 4412, a third n-type MOS 4413, a fourth n-type MOS 4421, a fifth n-type MOS 4422, a sixth n-type MOS 4423, a first p-type MOS 4414, a second p-type MOS 4424, a first comparator 4415, a second comparator 4425, and a regulator 4416. The first n-type MOS 4411 has a gate terminal, a source terminal and a drain terminal, where the source terminal is electrically connected to ground. The second n-type MOS 4412 has a gate terminal, a source terminal and a drain terminal, where the source terminal is electrically connected to ground. The third n-type MOS 4413 has a gate terminal, a source terminal and a drain terminal, where the source terminal is electrically connected to ground. The fourth n-type MOS 4421 has a gate terminal, a source terminal and a drain terminal, where the source terminal is electrically connected to ground. The fifth n-type MOS 4422 has a gate terminal, a source terminal and a drain terminal, where the source terminal is electrically connected to ground. The sixth n-type MOS 4423 has a gate terminal, a source terminal and a drain terminal, where the source terminal is electrically connected to ground. The first p-type MOS 4414 has a gate terminal, a source terminal and a drain terminal, where the gate terminal is electrically connected to the drain and the gate terminal of the third n-type MOS 4413, and the drain terminal is electrically connected to the drain and the gate terminal of the third n-type MOS 4413. The second p-type MOS 4424 has a gate terminal, a source terminal and a drain terminal, where the drain terminal and the gate terminal are electrically connected to ground. The first comparator 4415 has a first input terminal, a second input terminal, a third input terminal, a first output terminal and a ground terminal, where the first input terminal is electrically connected to the drain terminal of the first n-type MOS 4411, and the second input terminal is electrically connected to the drain terminal of the second n-type MOS 4412, the third input terminal is electrically connected to the output terminal of the constant to absolute temperature (CTAT) current source 430. The first comparator 4415 is used for determining the detected corner state according to the relationship of a first detected current ($I_{DET1}$), a threshold voltage of the first p-type MOS 4414, and a threshold voltage of the third n-type MOS 4413. The second comparator 4425 has a first input terminal, a second input terminal, a third input terminal, a first output terminal and a ground terminal, where the first input terminal is electrically connected to the drain terminal of the fourth n-type MOS 4421, the second input terminal is electrically connected to the drain terminal of the fifth n-type MOS 4422, and the third input terminal is electrically connected to the output terminal of the constant to absolute temperature (CTAT) current source 430. The second comparator 4425 is used for determining the detected corner state according to the relationship of a second detected current ($I_{DET2}$), a threshold voltage of the second p-type MOS 4424, and a threshold voltage of the sixth n-type MOS 4423. The regulator 4416 has an output terminal and a ground terminal, where the output terminal is electrically connected to the source terminal of the first p-type MOS 4414. The regulator 4416 is used for providing a predetermined voltage ($V_{DET}$). Wherein the gate terminal of the first n-type MOS 4411, the gate terminal of the second n-type MOS 4412, the gate terminal of the third n-type MOS 4413 are connected to the drain terminal of the first p-type MOS 4414. The gate terminal of the fourth n-type MOS 4421, the gate terminal of the fifth n-type MOS 4422, the gate terminal of the sixth n-type MOS 4423 are connected to the source terminal of the second p-type MOS 4424. The drain terminal of the sixth n-type MOS 4423 is used for receiving the second detected current ($I_{DET2}$). The source terminal of the second p-type MOS 4424 is used for receiving the current ($I_{CTAT}$) of the constant to absolute temperature (CTAT) current source 430.

It should be noted that the first n-type MOS 4411, the second n-type MOS 4412, the third n-type MOS 4413, the fourth n-type MOS 4421, the fifth n-type MOS 4422, the sixth n-type MOS 4423, the first p-type MOS 4414 and the second p-type MOS 4424 can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

It should be noted that the corner detector 440 can be divided into two sub-circuit, shown in FIG. 8(*a*) and FIG. 8(*b*). The circuit in FIG. 8(*a*) is used for determining the states of (F,F) and (S,S), the circuit in FIG. 8(*b*) is used for determining the states of (S,F) and (F,S). Their corresponding operating steps are described as following:

<For FIG. 8(*a*)>

Step1: Using predetermined voltage $V_{DET}$ from the regulator 4416 as reference voltage;

Step2: Applying the $V_{DET}$ to the source terminal of the first p-type MOS 4414;

Step3: Producing a detected current, $I_{DET1}$;

Step4: Mirroring the detected current, $I_{DET1}$ to the first input terminal and the second input terminal of the first comparator 4415;

Step5: Comparing the detected current $I_{DET1}$ with the current ($I_{CTAT}$).

$$I_{DET1} = N_x \left( \frac{V_{DET} - V_{thp} - V_{thn}}{\sqrt{\frac{N_x}{P_x}} + 1} \right)^2, N_x = \frac{1}{2}\mu_n C_{ox} \frac{W_n}{L_n}, P_x = \frac{1}{2}\mu_p C_{ox} \frac{W_p}{L_p}$$

where $V_{thp}$ is the threshold voltage of the first p-type MOS 4414, and $V_{thn}$ is the threshold voltage of the third n-type MOS 4413.

By forming the above operating steps and the formulation above, it is clear observed that the detected current $I_{DET1}$ increases while the threshold voltage of the first p-type MOS 4414 $V_{thp}$ and the threshold voltage of the third n-type MOS 4413 ($V_{thn}$) are increasing, on the contrary, the detected current $I_{DET1}$ decreases while the threshold voltage of the first p-type MOS 4414 $V_{thp}$ and the threshold voltage of the third n-type MOS 4413 ($V_{thn}$) are decreasing. And then, the detected current $I_{DET1}$ is mirrored and input into the first comparator 4415 according to the first n-type MOS 4411 and the second n-type MOS 4412. Finally, to compare the detected current $I_{DET1}$ with the current ($I_{CTAT}$). If the detected current $I_{DET1}$ is increasing, the state of (F,F) can be identified. On the contrary, the state of (S,S) can be identified. These tow results are output as $I_{OUT\_CORNER\_1}$ by the output terminal of the first comparator 4415. FIG. 11 shows the comparison of detected current $I_{DET1}$.

<For FIG. 8(*b*)>

Step 1: Generating one source voltage by using a predetermined current $I_{CTAT}$ which is from the Constant to absolute temperature (CTAT) 430 through the second p-type MOS 4424;

Step 2: Applying the current $I_{CTAT}$ to the sixth n-type MOS 4423;

Step 3: Producing a detected current $I_{DET2}$.

Step 4: Mirroring the detected current, $I_{DET2}$ to the first input terminal and the second input terminal of the second comparator 4425;

Step 5: Comparing the detected current $I_{DET2}$ with the current ($I_{CTAT}$).

$$I_{DET2} = \frac{1}{2} N_x \left( \sqrt{\frac{2I_{CTAT}}{P_x}} + V_{thp} - V_{thn} \right)^2, N_x = \mu_n C_{ox} \frac{W_n}{L_n}, P_x = \mu_p C_{ox} \frac{W_p}{L_p}$$

where $V_{thp}$ is the threshold voltage of the second p-type MOS 4424, and $V_{thn}$ is the threshold voltage of the sixth n-type MOS 4423.

By forming the above operating steps and the formulation above, it is clear observed that the detected current $I_{DET2}$ would vary while the threshold voltage of the first p-type MOS 4414 $V_{thp}$ and the threshold voltage of the third n-type MOS 4413 ($V_{thn}$) are varying. And then, the detected current $I_{DET2}$ is mirrored and input into the second comparator 4425 according to the fourth n-type MOS 4421 and the fifth n-type MOS 4422. Finally, to compare the detected current $I_{DET2}$ with the current ($I_{CTAT}$). If the detected current $I_{DET2}$ is increasing, the state of (F,S) can be identified. On the contrary, the state of (S,F) can be identified. These tow results are output as $I_{OUT}$_CORNER_2 by the output terminal of the second comparator 4416. The FIG. 12 shows the comparison of detected current $I_{DET2}$.

Figure 9:
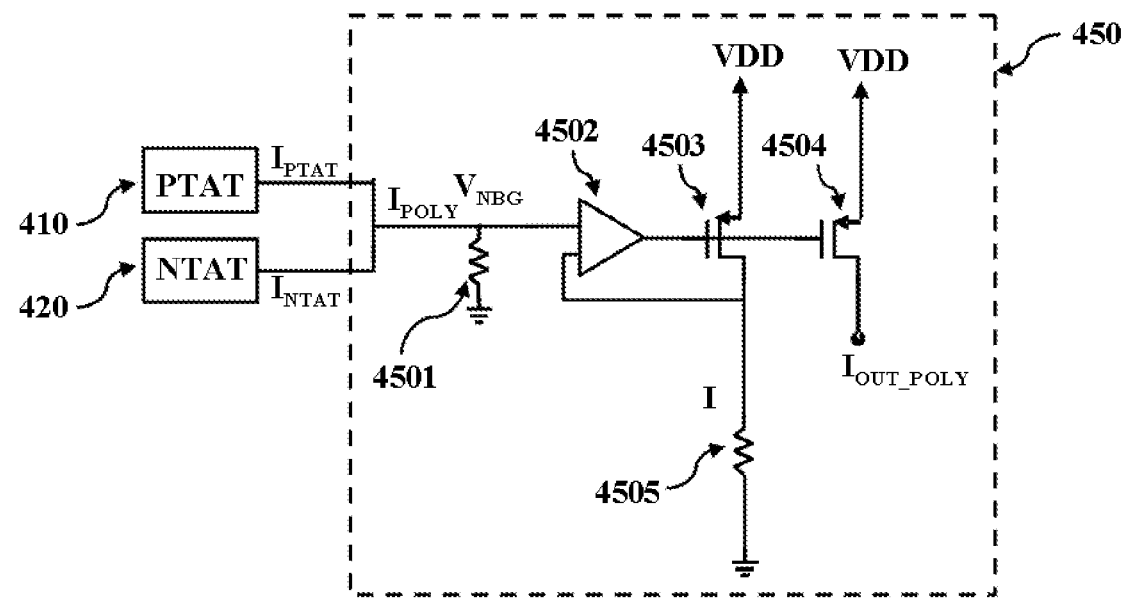
FIG. 9 shows a schematic circuit of the poly detector of the present invention.

Now please refer to FIG. 9, it shows the schematic circuit of the poly detector 450 of the present invention. The poly detector 450 further comprising: a first poly resistor 4501, an operational amplifier 4502, a first p-type MOS 4503, a second p-type MOS 4504, a second poly resistor 4505. The first poly resistor 4501 has a first terminal and a ground terminal and is used for providing a temperature compensated reference voltage ($V_{NBG}$). The operational amplifier 4502 has an output terminal, a negative input terminal and a positive input terminal, where the negative input terminal is electrically connected to the first terminal of the first poly resistor 4501. The first p-type MOS 4503 has a gate terminal, a source terminal and a drain terminal, the drain terminal is electrically connected to the positive terminal of the operational amplifier 4502. The second p-type MOS 4504 has a gate terminal, a source terminal and a drain terminal. The poly resistor 4505 has a first terminal and a ground terminal, where the first terminal is electrically connected to the drain terminal of the first p-type MOS 4503. Wherein the temperature compensated reference voltage ($V_{NBG}$) is generated by passing a current ($I_{POLY}$) to the first poly resistor 4501, where the current ($I_{POLY}$) is the summation of the current of the proportional to absolute temperature (PTAT) current source 410 and the current of negative to absolute temperature (NTAT) current source 420. The gate terminal of the first p-type MOS 4503 and the gate terminal of the second p-type MOS 4504 are electrically connected to the output terminal of the operational amplifier 4502, the drain terminal of the second p-type MOS 4504 is used for outputting an output current ($I_{OUT\_POLY}$) of the poly detector 450. It should be noted that the first p-type MOS 4503 and the second p-type MOS 4504 can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

It should be noted that the operating steps of the poly detector 450 are described as following:

Step 1: Forcing $V_{NBG}$ and the crossing voltage of the second poly resistor 4505 to be equal by using an operational amplifier 4502;

Step 2: Producing a current through the second poly resistor 4505.

$$I = \frac{V_{NBG}}{R}$$

where R is the second poly resistor 4505.

By forming the above operating steps, it can observe that the output current IOUT_POLY would be inverse proportional to the variation of the second poly resistor 4505. The variance of poly layer can be easily identified by comparing the output current IPOLY. Therefore, the state of POT, POF and POS could be easily identified. The FIG. 13 shows the comparison of current IOUT_POLY.

Figure 10:
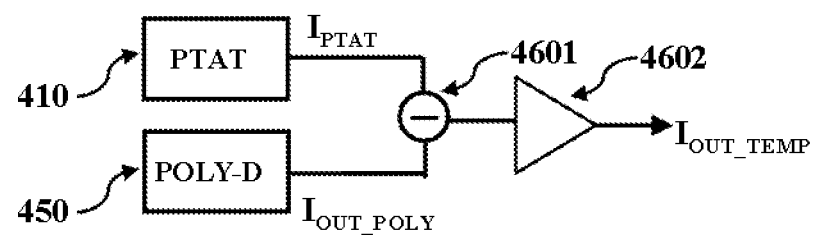
FIG. 10 shows a schematic circuit of the extreme temperature detector of the present invention.

Now please refer to FIG. 10, it shows the schematic circuit of the extreme temperature detector 460 further comprising: a substractor 4601, and an amplifier 4602. The substractor 4601 has a first input terminal, a second input terminal and an output terminal, where the first input terminal is electrically connected to the first input terminal of the extreme temperature detector and the second input terminal is electrically connected to the second input terminal of the extreme temperature detector. The amplifier 4602 has an input terminal and a output terminal, where the input terminal is electrically connected to the output terminal of the substractor 4601. Wherein the extreme temperature detector 460 determines the temperature state according to a outputted current of $I_{OUT\_TEMP}$ by the output terminal of the amplifier 4602.

It should be noted that the operating steps of the extreme temperature detector 460 are described as following:

Step 1: Using the current ($I_{PTAT}$) of the proportional to absolute temperature (PTAT) current source 410 as temperature sensor and current $I_{OUT\_POLY}$ as reference;

Step 2: Subtracting those two currents.

Step 3: Multiplying the subtracted current by the amplifier 4602;

By forming the above operating steps, it can observe that the variance of environment temperature can be easily identified by subtracting the current ($I_{PTAT}$) of the proportional to absolute temperature (PTAT) current source 410 and the output current $I_{OUT\_POLY}$ of the poly detector 450. Therefore, the state of TM, TH and TL could be easily identified. The FIG. 14 shows the comparison of the current ($I_{PTAT}$) and current $I_{OUT\_POLY}$.

To reduce the corner variation from poly processing, the type of the resistor 4102 in proportional to absolute temperature (PTAT) current source 410, the first poly resistor 4501 and the second poly resistor 4505 in poly detector 450 is the same.

Now please refer to FIG. 15, it shows the outputs of the circuit used for indicating process corner and extreme temperature 400, each output has only two states 1 or 0. Whenever the output state of corner detector 440 or the output state of extreme detector 460 reached the extreme case, the outputs of the circuit used for indicating process corner and extreme temperature 400 would be set 1 according to nowadays condition. Otherwise, the state will stay at 0.

The functions and the advantages of the present invention have been shown. Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A circuit used for indicating process corner and extreme temperature, comprising:
    a proportional to absolute temperature (PTAT) current source, having an output terminal, used for providing a current ($I_{PTAT}$);
    a negative to absolute temperature (NTAT) current source, having an output terminal, used for providing a current ($I_{NTAT}$);
    a constant to absolute temperature (CTAT) current source, having an output terminal, used for providing a current ($I_{CTAT}$);
    a corner detector, having an input terminal and an output terminal, the input terminal electrically connected to the output terminal of the constant to absolute temperature (CTAT) current source, used for indicating a detected corner state;
    a poly detector, having a first input terminal, a second input terminal, a third input terminal and an output terminal, the first input terminal electrically connected to the output terminal of the proportional to absolute temperature (PTAT) current source, the second input terminal electrically connected to the output terminal of the negative to absolute temperature (NTAT) current source, and the third input terminal electrically connected to the output terminal of the constant to absolute temperature (CTAT) current source, used for indicating a detected poly state; and
    an extreme temperature detector, having a first input terminal, a second input terminal, and an output terminal, the first input terminal electrically connected to the output terminal of the proportional to absolute temperature (PTAT) current source, and the second input terminal electrically connected to the output terminal of the poly detector, used for indicating a detected temperature state.

2. The circuit as claimed in claim 1, wherein the circuit used for indicating process corner and extreme temperature can be realized by using the 0.18 μm, 0.13 μm, 0.09 μm, 0.045 μm, 0.023 μm, 0.011 μm or the advanced process.

3. The circuit as claimed in claim 1, wherein the corner detector further comprising:
    a first n-type MOS, having a gate terminal, a source terminal and a drain terminal, the source terminal electrically connected to ground;
    a second n-type MOS, having a gate terminal, a source terminal and a drain terminal, the source terminal electrically connected to ground;
    a third n-type MOS, having a gate terminal, a source terminal and a drain terminal, the source terminal electrically connected to ground;
    a fourth n-type MOS, having a gate terminal, a source terminal and a drain terminal, the source terminal electrically connected to ground;
    a fifth n-type MOS, having a gate terminal, a source terminal and a drain terminal, the source terminal electrically connected to ground;
    a sixth n-type MOS, having a gate terminal, a source terminal and a drain terminal, the source terminal electrically connected to ground;
    a first p-type MOS, having a gate terminal, a source terminal and a drain terminal, the gate terminal electrically connected to the drain and the gate terminal of the third n-type MOS, and the drain terminal electrically connected to the drain and the gate terminal of the third n-type MOS;
    a second p-type MOS, having a gate terminal, a source terminal and a drain terminal, the drain terminal and the gate terminal electrically connected to ground;
    a first comparator, having a first input terminal, a second input terminal, a third input terminal, a first output terminal and a ground terminal, the first input terminal electrically connected to the drain terminal of the first n-type MOS, and the second input terminal electrically connected to the drain terminal of the second n-type MOS, the third input terminal electrically connected to the output terminal of the constant to absolute temperature (CTAT) current source, used for determining the detected corner state according to the relationship of a first detected current ($I_{DET1}$), a threshold voltage of the first p-type MOS, and a threshold voltage of the third n-type MOS;
    a second comparator, having a first input terminal, a second input terminal, a third input terminal, a first output terminal and a ground terminal, the first input terminal electrically connected to the drain terminal of the fourth n-type MOS, the second input terminal electrically connected to the drain terminal of the fifth n-type MOS, and the third input terminal electrically connected to the output terminal of the constant to absolute temperature (CTAT) current source, used for determining the detected corner state according to the relationship of a second detected current ($I_{DET2}$), a threshold voltage of the second p-type MOS, and a threshold voltage of the sixth n-type MOS;
    a regulator, having an output terminal and a ground terminal, the output terminal electrically connected to the source terminal of the first p-type MOS, used for providing a predetermined voltage ($V_{DET}$); and
    wherein the gate terminal of the first n-type MOS, the gate terminal of the second n-type MOS, and the gate terminal of the third n-type MOS are connected to the drain terminal of the first p-type MOS; the gate terminal of the fourth n-type MOS, and the gate terminal of the fifth n-type MOS, and the gate terminal of the sixth n-type MOS are connected to the source terminal of the second p-type MOS; the drain terminal of the sixth n-type MOS is used for receiving the second detected current ($I_{DET2}$); and the source terminal of the second p-type MOS is used for receiving the current ($I_{CTAT}$) of the constant to absolute temperature (CTAT) current source.

4. The circuit as claimed in claim 3, wherein the first n-type MOS, the second n-type MOS, the third n-type MOS, the fourth n-type MOS, the fifth n-type MOS, the sixth n-type MOS, the first p-type MOS, and the second p-type MOS can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

5. The circuit as claimed in claim 1, wherein the poly detector further comprising:
- a first poly resistor, having a first terminal and a ground terminal, used for providing a temperature compensated reference voltage ($V_{NBG}$);
- an operational amplifier, having a output terminal, a negative input terminal and a positive input terminal, the negative input terminal electrically connected to the first terminal of the first poly resistor;
- a first p-type MOS, having a gate terminal, a source terminal and a drain terminal, the drain terminal electrically connected to the positive terminal of the operational amplifier;
- a second p-type MOS, having a gate terminal, a source terminal and a drain terminal;
- a second poly resistor, having a first terminal and a ground terminal, the first terminal electrically connected to the drain terminal of the first p-type MOS; and
- wherein the temperature compensated reference voltage ($V_{NBG}$) is generated by passing a current ($I_{POLY}$) to the first poly resistor, where the current ($I_{POLY}$) is the summation of the current of the proportional to absolute temperature (PTAT) current source and the current of negative to absolute temperature (NTAT) current source;

the gate terminal of the first p-type MOS and the gate terminal of the second p-type MOS are electrically connected to the output terminal of the operational amplifier, and the drain terminal of the second p-type MOS is used for outputting an output current ($I_{OUT\_POLY}$) of the poly detector.

6. The circuit as claimed in claim 5, wherein the first p-type MOS and the second p-type MOS can be replaced and selected from Bipolar Junction Transistor (BJT), Heterojunction Bipolar Transistor (HBT), High Electronic Mobility Transistor (HEMT), Pseudomorphic HEMT (PHEMT), Complementary Metal Oxide Semiconductor Filed Effect Transistor (CMOS) and Laterally Diffused Metal Oxide Semiconductor Filed Effect Transistor (LDMOS).

7. The circuit as claimed in claim 1, wherein the extreme temperature detector further comprising:
- a subtractor, having a first input terminal, a second input terminal and an output terminal, the first input terminal electrically connected to the first input terminal of the extreme temperature detector, and the second input terminal electrically connected to the second input terminal of the extreme temperature detector;
- an amplifier, having a input terminal and a output terminal, the input terminal electrically connected to the output terminal of the subtractor; and
- wherein the extreme temperature detector determines the temperature state according to an outputted current of $I_{OUT\_TEMP}$ by the output terminal of the amplifier.

* * * * *